US011038961B2

(12) United States Patent
Chintada

(10) Patent No.: US 11,038,961 B2
(45) Date of Patent: Jun. 15, 2021

(54) ETHERNET IN DATA STORAGE DEVICE

(71) Applicant: Western Digital Technologies, Inc., San Jose, CA (US)

(72) Inventor: Lakshmana Chintada, Gilbert, AZ (US)

(73) Assignee: Western Digital Technologies, Inc., San Jose, CA (US)

( * ) Notice: Subject to any disclaimer, the term of this patent is extended or adjusted under 35 U.S.C. 154(b) by 172 days.

(21) Appl. No.: 16/171,979

(22) Filed: Oct. 26, 2018

(65) Prior Publication Data

US 2020/0137161 A1   Apr. 30, 2020

(51) Int. Cl.
*G06F 15/173* (2006.01)
*H04L 29/08* (2006.01)
*H04L 12/931* (2013.01)
*H04L 29/12* (2006.01)

(52) U.S. Cl.
CPC ........ *H04L 67/1097* (2013.01); *H04L 49/356* (2013.01); *H04L 61/6022* (2013.01); *H04L 67/1095* (2013.01); *H04L 67/322* (2013.01)

(58) Field of Classification Search
CPC .................................................. H04L 41/0803
USPC .................................................. 709/224, 226
See application file for complete search history.

(56) References Cited

U.S. PATENT DOCUMENTS

2015/0113317 A1\* 4/2015 Ouyang .............. G06F 11/1464
714/6.3
2019/0356609 A1\* 11/2019 Grunwald ........... G06F 11/2097

OTHER PUBLICATIONS

NVM Express, Inc., NVM Express Over Fabrics Overview White Paper, available at: https://nvmexpress.org/wp-content/uploads/NVMe_Over_Fabrics.pdf, accessed Oct. 26, 2018.
Brandon Hoff, NVMe over Fabrics Presentation, Sep. 20, 2017, available at https://nvmexpress.org/wp-content/uploads/NVMe_over_Fabrics_Sept_2017_Brandon_Hoff.pdf.

\* cited by examiner

*Primary Examiner* — Wing F Chan
*Assistant Examiner* — Andrew Woo
(74) *Attorney, Agent, or Firm* — Barry IP Law, P.C.

(57) ABSTRACT

A Data Storage Device (DSD) includes a plurality of storage areas for storing data. A command is received from a host to write data or read data in the DSD, and a storage area is identified for writing the data or reading the data for the command. An internal command is sent to the identified storage area to write the data or read the data for the command using an Ethernet protocol. In another aspect, a command is received from a controller of a DSD to copy data from one storage area to a different storage area of the DSD. The different storage area is identified using an address included in the command received from the controller, and the data for the command is read from the storage area. The data is sent to the different storage area using the address included in the command received from the controller.

22 Claims, 12 Drawing Sheets

ETHERNET IN DATA STORAGE DEVICE

BACKGROUND

Data Storage Devices (DSDs) can include a variety of different types of storage media for storing data. Current DSDs typically include a controller that manages the storage of data in the storage media. Traditionally, the controller is connected to the storage media via a proprietary interface protocol of the DSD manufacturer.

The storage media is generally passive in the sense that the controller of the DSD initiates the commands within the DSD for reading and writing data in the storage media, regardless of whether the reading or writing is for performing commands received from a host or for performing maintenance operations for portions of the storage media. In this regard, the controller may perform maintenance operations, such as copying valid data from one storage location to another for reclaiming portions of the storage media storing invalid data (e.g., garbage collection), or rewriting data from one storage location to another to maintain the integrity of the data (e.g., data recycling or refreshing), as in the case of NAND flash memory.

As the storage capacity of DSDs increases, the resources of the controller, such as a memory used by the controller and the controller's processing availability, become increasingly consumed with maintenance operations for the storage areas. The increased data traffic between the controller and the storage areas can also diminish the performance of the DSD in performing host commands.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
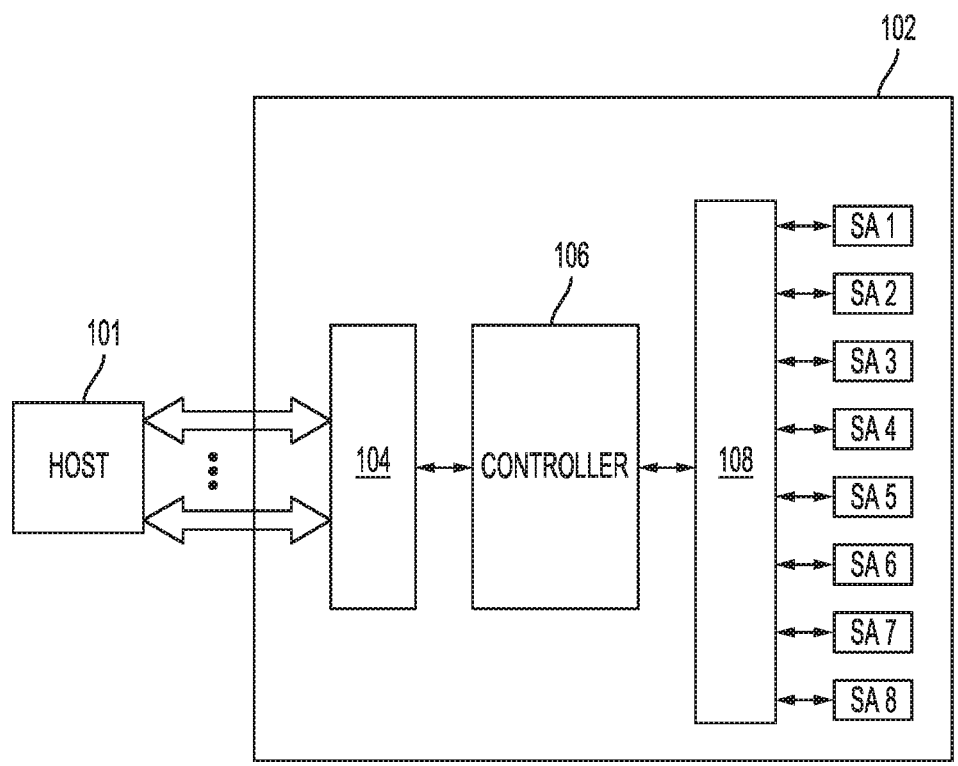
FIG. 1 is a block diagram of a Data Storage Device (DSD) according to an embodiment.

FIG. 1 is a block diagram of a Data Storage Device (DSD) according to an embodiment. As shown in FIG. 1, host 101 communicates with DSD 102 through one or more connections. As used herein, a host can refer to a device that is capable of issuing commands to a DSD to store data or retrieve data. Host 101 can include, for example, a server, a desktop computer, laptop, a mobile device, or other electronic device.

In the example of FIG. 1, DSD 102 includes host switch 104 configured to connect to host 101 for receiving data from host 101 and sending data to host 101. In some implementations, host switch 104 can include an Ethernet network switch for sending and receiving data via an Ethernet connection. In other implementations, host switch 104 may use a different standard for communicating with host 101, such as, for example, Serial Advanced Technology Attachment (SATA), Non-Volatile Memory express (NVMe), PCI express (PCIe), Small Computer System Interface (SCSI), Serial Attached SCSI (SAS), or WiFi. For example, host switch 104 may include a multiport Ethernet switch for use with NVMe over Ethernet, or may instead include a PCIe interface for use with NVMe over PCIe. As will be appreciated by those of ordinary skill in the art, host switch 104 may be combined with controller 106 in some implementations.

Host switch 104 may also communicate with host 101 using data packets in accordance with Transmission Control Protocol (TCP) and Internet Protocol (IP), or proprietary Ethernet protocol. Host 101 and DSD 102 may communicate through a network, such as a Local Area Network (LAN) or Wide Area Network (WAN), such as the internet. In this regard, host 101 and DSD 102 may not be physically co-located. In other implementations, host 101 and DSD 102 may communicate using a direct connection or bus connection, as opposed to through a network. Although only one host is shown in the example of FIG. 1, other implementations may include multiple hosts that communicate with DSD 102.

In the example of FIG. 1, DSD 102 includes controller 106, which controls operation of DSD 102. Controller 106 includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, controller 106 can include a System on a Chip (SoC). As discussed in more detail below, controller 106 can send internal commands to Storage Areas (SAs) (e.g., SAs 1 to 8 in FIG. 1) for reading, writing, or copying data.

SAs 1 to 8 in FIG. 1 include solid-state memory for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory (i.e., two or more levels), or any combination thereof), NOR memory, EEPROM, Ferroelectric Memory (FeRAM), Magnetoresistive RAM (MRAM), 3D XPoint memory, other discrete Non-Volatile Memory (NVM) chips, or any combination thereof.

Controller 106 communicates with SAs 1 to 8 via SA network Ethernet switch 108 using an Ethernet protocol. For example, SA network Ethernet switch 108 may be rated for conversion of maximum data transfer rates at 1G/10G. SA network Ethernet switch 108 is configured in DSD 102 as a non-blocking switch to connect each of SAs 1 to 8 and controller 106 to one another to form a network.

As discussed in more detail below, this can allow for data to be sent and received by different SAs without having to be routed through controller 106. In this regard, the SAs of DSD 102 can be considered active devices in that they can receive and transmit data to another SA without assistance from controller 106. This ordinarily reduces the data traffic experienced by conventional DSDs with passive storage media that must send all data for processing through a controller using a proprietary bus or controller, as opposed to an Ethernet network among the SAs as shown in FIG. 1. In addition, the resources of controller 106 (e.g., processing memory and processing availability) are conserved by controller 106 not having to handle the copying of data from one SA to another SA for maintenance operations such as garbage collection and data recycling.

In an example where the storage media is a NAND memory, the use of a controller's resources may be freed up by approximately 80% by not having to move data from one block of NAND memory to another block of NAND memory for data recycling. The data stored in NAND memory typically needs to be refreshed or recycled periodically by moving the data from a current block to a freshly erased block to maintain the integrity of the data. The amount of data being written for data recycling as compared to the amount of new data being written for a host command can be measured as write amplification in terms of the total amount of data written to the NAND memory divided by the amount of new data written for host commands. A typical write amplification in high endurance DSDs can be greater than five such that approximately four out of five writes are for copying data, as opposed to writing new data.

To move data from a current block to a freshly erased block when performing data recycling in a conventional NAND DSD, the controller reads the data from the current block, stores the data in a memory used by the controller (e.g., Dynamic Random Access Memory (DRAM) or Static Random Access Memory (SRAM)), and then writes the stored data to the destination erased block. During this time, both the data bus in the DSD and the controller are used and may not be available for performing other operations or commands. Such data recycling can become a bottleneck for high capacity DSDs with relatively large amounts of storage and can diminish the overall Quality of Service (QoS) provided by the DSD in terms of performing host commands.

In contrast, a controller of a NAND DSD of the present disclosure, where NAND SA's are connected via an Ethernet network, is instead freed from having to perform the reading and rewriting of data required for data recycling in a conventional NAND DSD. This can roughly translate to an 80% reduction (i.e., for four out of five write operations in the DSD with a write amplification of five) in the consumption of the controller's resources, as compared to a conventional NAND DSD for the same storage capacity and workload. The remaining 20% of the controller's resources can then focus on performing host write commands, which improves the performance of the DSD.

As discussed in more detail below, other implementations may include a different arrangement of components than those shown in FIG. 1. For example, other implementations may include multiple host switches, multiple controllers, and/or multiple SA network Ethernet switches. In addition, those of ordinary skill in the art will appreciate that the number of SAs shown in FIG. 1 may vary in different implementations.

Figure 2:
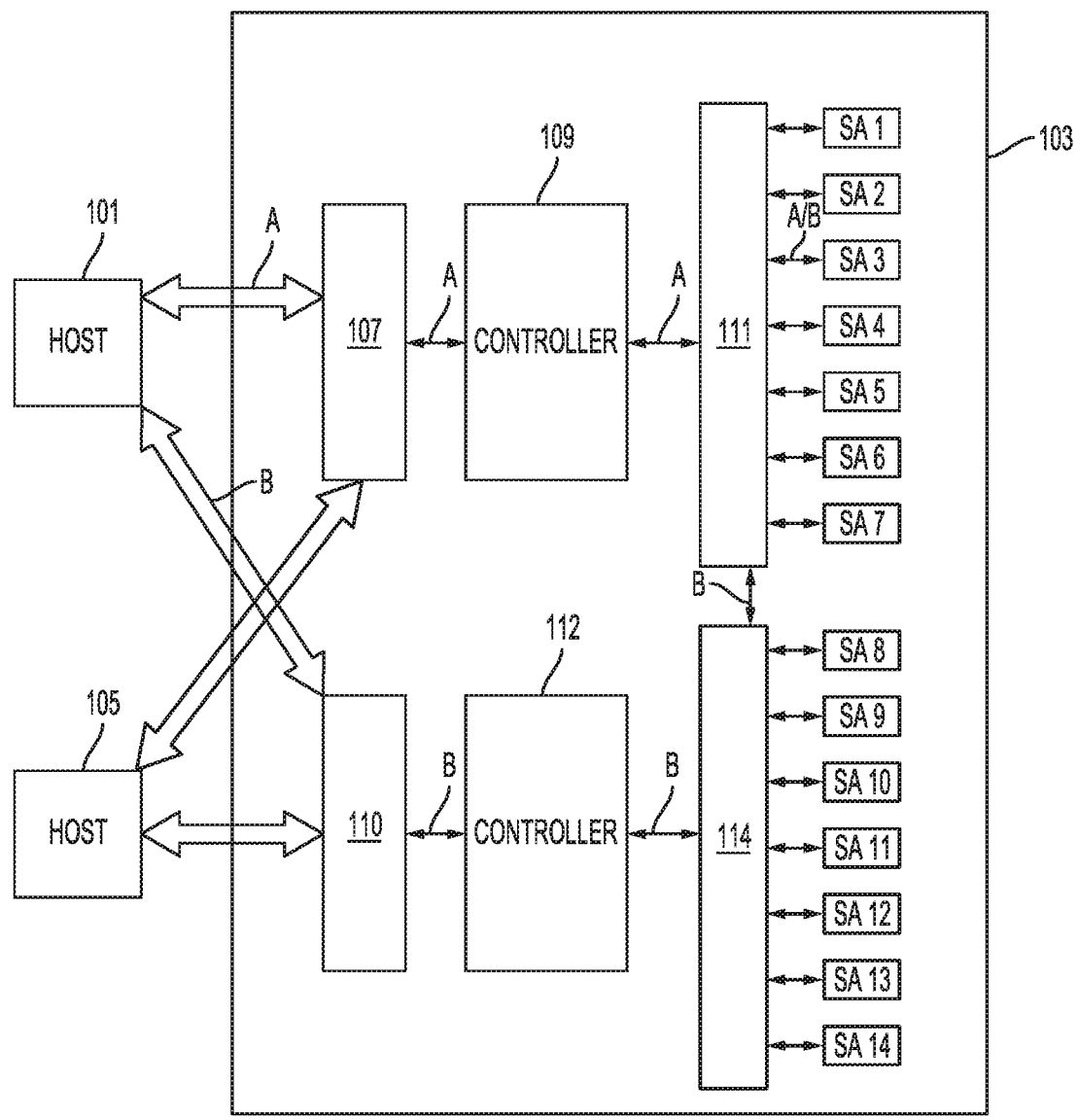
FIG. 2 is a block diagram of a DSD with multiple data paths between a controller and a Storage Area (SA) of the DSD according to an embodiment.

In this regard, FIG. 2 is a block diagram of DSD 103, which includes host network Ethernet switches 107 and 110, controllers 109 and 112, SA network switches 111 and 114, and SAs 1 to 14. Hosts 101 and 105 communicate with DSD 103 via host network Ethernet switches 107 and 110. Each of host network Ethernet switches 107 and 110 connect to each of hosts 101 and 105 as a non-blocking switch to provide a host switched Ethernet network. In addition, SA network Ethernet switches 111 and 114 provide a second network among the SAs and controllers 109 and 112.

As shown in FIG. 2, data accessed by host 101 or host 105, such as for a read or write command, may follow different data paths to a particular SA in DSD 103. In the example of FIG. 2, two different data paths are shown between host 101 and SA 3 in DSD 103. The first data path, labeled as data path A, connects host 101 to host network Ethernet switch 107, then to controller 109, then to SA network switch 111, and finally to SA 3. The second data path, labeled as data path B, connects host 101 to host network Ethernet switch 110, then to controller 112, then to SA network switch 114, then to SA network switch 111, and finally to SA 3.

In one example, host 101 may determine whether to send a command on the first path by sending the command to host network Ethernet switch 107 or on the second path by sending the command to host network Ethernet switch 110. In determining whether to send the command on the first path or the second path, host 101 may consider, for example, at least one of an availability of one or both of host network Ethernet switches 107 and 110, an availability of one or both of controllers 109 and 112, and an amount of data traffic through one or both of host network Ethernet switches 107 and 110. In some implementations, host 101 may use Spanning Tree Protocol (STP Institute of Electrical and Electronic Engineers (IEEE) 802.1D), Rapid Spanning Tree Protocol (RSTP IEEE 802.1w), or Multiple Spanning Tree Protocol (MSTP IEEE 802.1s).

In this regard, DSD 103 may provide host 101 with an indication of the availability of one or both of host network Ethernet switches 107 and 110, an indication of the availability of one or both of controllers 109 and 112, and/or an indication of an amount of data traffic through one or both of host network Ethernet switches 107 and 110. Such indications may result from a request from host 101 or may result from DSD 103 on its own initiative sending an indication when data traffic through a host network Ethernet switch reaches a predetermined level, the failure of a component such as a controller or host network Ethernet switch (e.g., STP, RSTP, or MSTP identifying a port failure in determining the active network), or the availability of a host network Ethernet switch or controller reaching a predetermined level.

The arrangement shown in FIG. 2 including alternative data paths via SA network Ethernet switches within DSD 103 can allow for a more efficient use or better sharing of resources within DSD 103, including host network switches, interfaces, controllers, and the connections between components within DSD 103. The routing of commands along different data paths within DSD 103 ordinarily results in improved performance when performing a high workload of host commands (e.g., a high Input/Output Operations Per Second (IOPS)), since more host commands can be handled by DSD 103 at a given time. In addition, the use of multiple data paths within DSD 103 can provide alternate routes in case of failure of one or more components within DSD 103, such as a controller or host network switch.

Figure 3:
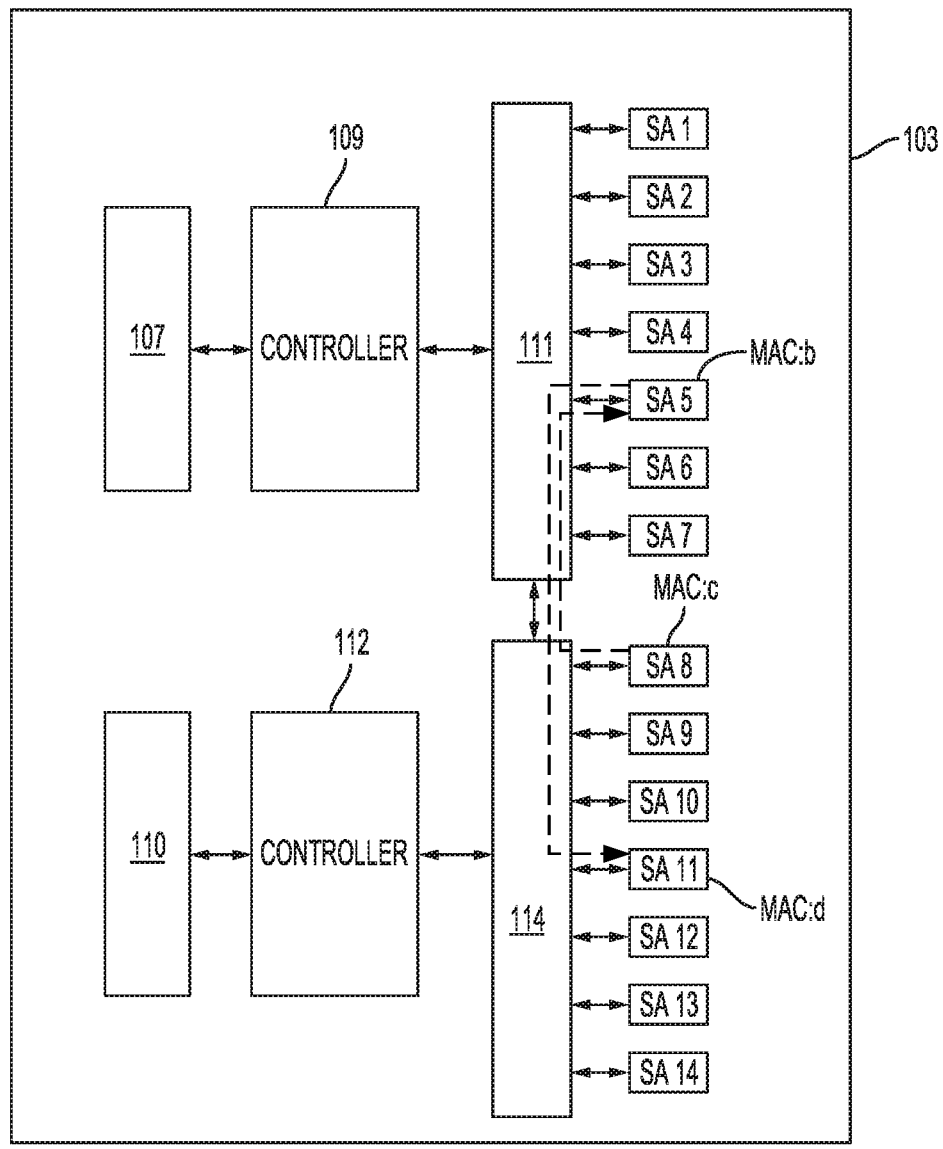
FIG. 3 provides an example of a data recycling operation according to an embodiment.

FIG. 3 provides an example of a data recycling or data copying operation according to an embodiment. As noted above, certain types of solid-state memory such as NAND flash memory may require data to be periodically rewritten or refreshed to maintain the integrity of the data. In addition, solid-state memory may require valid data to be read from one portion of the memory as part of a garbage collection operation and rewritten to another portion of the memory to reclaim portions of the memory storing invalid data. Such invalid data can result from wear-leveling of the storage media or address indirection when data can only be written in a specified size, such as a block size. Updates to data smaller than the specified size are written in a new block and the old version of the data is then considered invalid or obsolete. The configuration of DSD 103 allows for the copying of data from one SA to another SA for the foregoing maintenance operations, without having to send the data from the current SA to the controller, and then from the controller to the new SA where the data is to be rewritten.

As shown by the dashed lines in the example of FIG. 3, data is recycled or rewritten from SA 5 to SA 11, and from SA 8 to SA 5. Each of the SAs in FIG. 3 have their own Media Access Control (MAC) address to identify and locate the SA. As shown in FIG. 3, SA 5 has a MAC address represented in FIG. 3 as MAC:b, SA 8 has a MAC address represented in FIG. 3 as MAC:c, and SA 11 has a MAC address represented in FIG. 3 as MAC:d. Those of ordinary skill in the art will appreciate that a MAC address includes six octets or bytes to uniquely identify a component.

The data transferred from SA 5 to SA 11 is sent through SA network Ethernet switch 111 to SA network Ethernet switch 114, and then to SA 11. Similarly, the data transferred from SA 8 to SA 5 is sent through SA network Ethernet switch 114 to SA network Ethernet switch 111, and then to SA 5.

As discussed in more detail below with reference to the sequence diagram of FIG. 7 and the flowchart of FIG. 12, a controller of DSD 103 (e.g., controller 109 or 112) can send an internal data recycle or copy command to a current SA, such as SA 5, with a MAC address identifying SA 11 as a destination for receiving data from SA 5. In some implementations, and as discussed in more detail below with reference to the example internal frame format of FIG. 9A, a controller of DSD 103 may use both a source SA MAC address (e.g., MAC:b for SA 5) and a destination MAC address (e.g., MAC:d for SA 11) included in a frame for the recycle/copy command to route the command to the source SA 5 and to route the read data from SA 5 to SA 11 via SA network Ethernet switch 114. As used herein, a frame can be considered the same as a command.

In some implementations, SA 8 may then receive a recycle or copy command from controller 109 or 112 to read and send the read data to SA 5, which may have been recently erased, or a portion recently erased, after transferring data to SA 11. A frame for the recycle or copy command from the controller may include a source MAC address (e.g., MAC:c for SA 8) for where the data is to be read from, and a destination MAC address (e.g., MAC:d) for where the data is to be rewritten. As discussed above, this addressing of individual SAs within a DSD and the use of one or more SA network switches can significantly reduce the amount of data being handled by the controller and being sent back and forth between the controller and the SAs.

Figure 4:
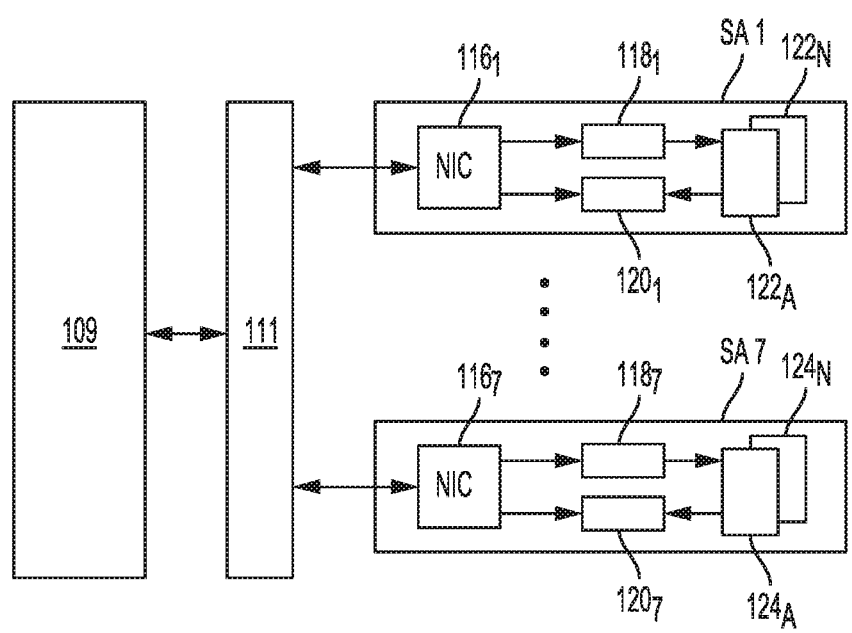
FIG. 4 is a block diagram of a controller in communication with flash memory package SAs via an SA network Ethernet switch according to an embodiment.

FIG. 4 is a block diagram of controller 109 in communication with flash memory package SAs via SA network Ethernet switch 111 according to an embodiment. As shown in FIG. 4, controller 109 communicates or is connected to SA network Ethernet switch 111 via an Ethernet protocol or standard. SA network Ethernet switch 111, for its part, is connected to a plurality of SAs, such as SA 1 and SA 7 shown in FIG. 4 so as to form a SA network including controller 109 and SAs 1 to 7.

Each of SAs 1 to 7 include a Network Interface Controller (NIC) 116 (e.g., NICs $116_1$ and $116_7$), which may include, for example, a hardware accelerator such as an FPGA for handling Ethernet packets. Each NIC 116 is assigned its own MAC address for its respective SA. In addition, each SA includes its own Low-Density Parity-Check (LDPC) encoder 118 (e.g., LDPC encoders $118_1$ and $118_7$) and LDPC decoder 120 (LDPC decoders $120_1$ and $120_7$). LDPC encoder 118 and LDPC decoder 120 may include, for example, a hardware accelerator such as an FPGA for encoding and decoding data to ensure the integrity of the data being retrieved from the flash memory package of the SA. In this regard, LDPC can be used to correct any bits that may have inadvertently flipped since being stored in the flash memory package. In other implementations, a different error detection and/or error correction algorithm may be used.

NIC 116 receives Ethernet packets from controller 109 or another controller such as controller 112 in FIG. 3. In addition, NIC 116 may receive Ethernet packets from another SA served by SA network Ethernet switch 111 or another SA network Ethernet switch, such as SA network Ethernet switch 114 in FIG. 3. The data from the Ethernet packets may then be sent to LDPC encoder 118 for error correction before reading or writing data in a flash memory package of the SA, such as a flash memory package including dies 122A to 122N in SA 1 or a flash memory package including dies 124A to 124N in SA 7.

For data sent from a flash memory package in the example of FIG. 4, such as data read from one of dies 122A to 122N or dies 124A to 124N, the data is decoded by LDPC decoder 120 (e.g., LDPC decoder $120_1$ or $120_7$) with any necessary error correction to maintain the integrity of the data. NIC 116 then packages the data in accordance with an Ethernet protocol and sends the Ethernet data packet with the read data to SA network Ethernet switch 111 for routing to a controller or SA corresponding to a destination MAC address. Example frame formats for inclusion in an Ethernet packet are provided in more detail below with reference to FIGS. 8, 9A, and 9B.

Figure 5:
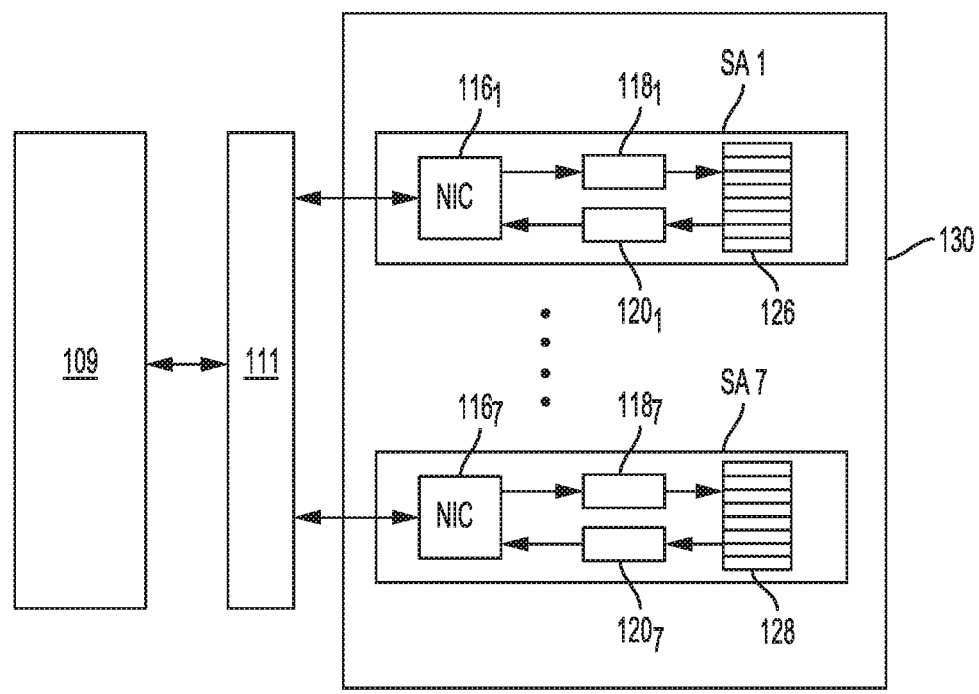
FIG. 5 is a block diagram of a controller in communication with flash memory die SAs via an SA network Ethernet switch according to an embodiment.

FIG. 5 is a block diagram of controller 109 in communication with flash memory die SAs via SA network Ethernet switch 111 according to an embodiment. The components shown in FIG. 5 correspond to same numbered components described above for FIG. 4. However, the arrangement shown in FIG. 5 differs from that shown in FIG. 4 in that each SA corresponds to a flash memory die as opposed to a flash memory package that includes multiple flash memory dies as in FIG. 4. As shown in FIG. 5, each SA (e.g., SA 1 and SA 7) include only one flash memory die, such as flash memory die 126 for SA 1 and flash memory die 128 for SA 7. Each SA die includes a plurality of blocks. The SAs in FIG. 5 form flash memory package 130.

As with the example shown in FIG. 4, each SA has its own MAC address. Such finer granularity in addressing can result in less processing performed at the flash memory package level, but can require a greater hardware cost in providing additional NICs and LDPC encoders and decoders for each die as opposed to each package of dies. In other implementations, the addressing may even be extended down to a block level within dies so that each block represents a different SA, as opposed to each die representing a different SA as in the example of FIG. 5.

Example Sequences

Figure 6:
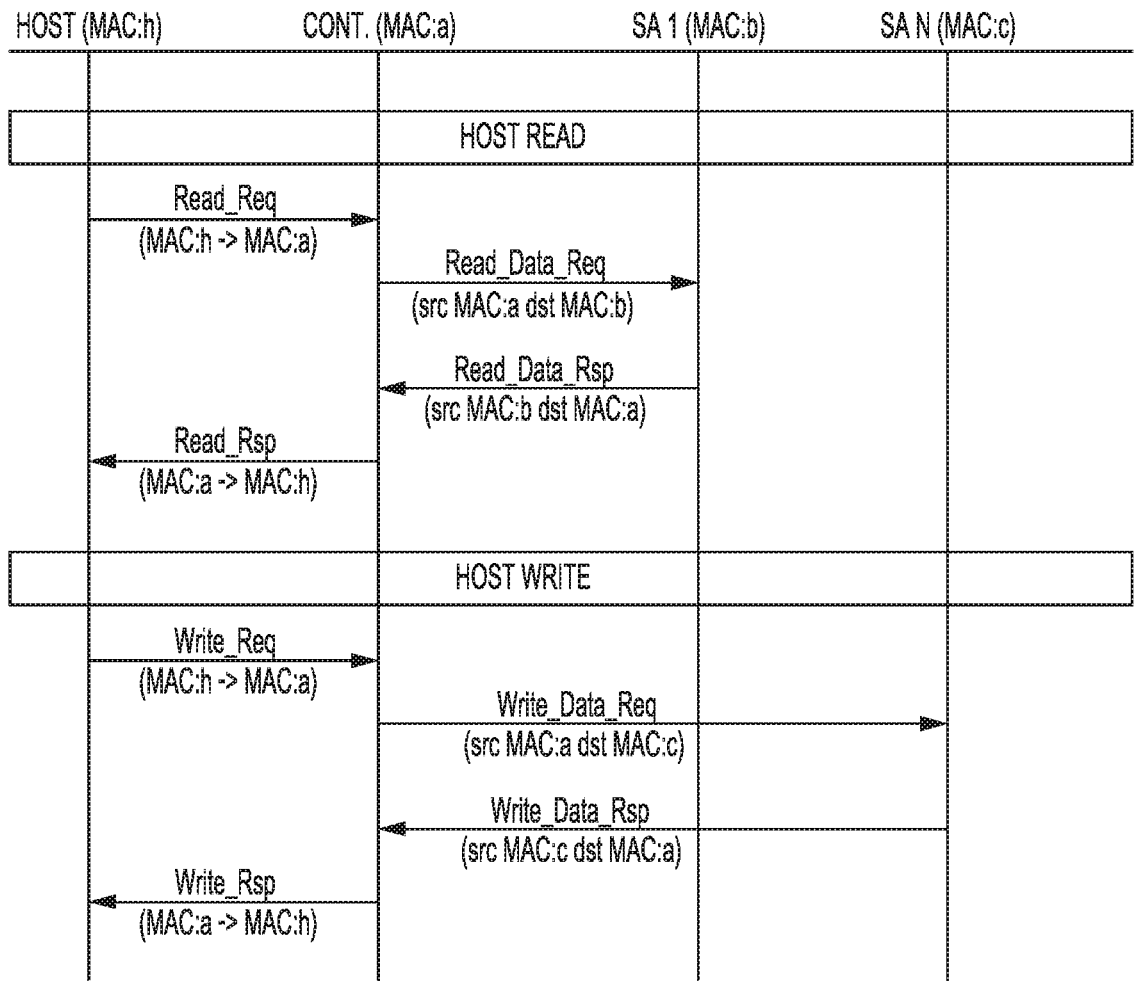
FIG. 6 provides sequence diagrams for performing a host read command and a host write command according to an embodiment.

FIG. 6 provides example sequence diagrams for performing a host read command and a host write command according to an embodiment. As shown in the top part of FIG. 6, a host read request or command is sent from a host with a MAC address represented as MAC:h to a controller of a DSD with a destination MAC address represented by MAC:a. After passing through a host network switch to the controller, the controller identifies SA 1 as the SA storing the requested data from among a plurality of SAs in the DSD for reading the data in the received host read request. In some implementations, the controller may use a logical to physical mapping to identify SA 1 as corresponding to one or more logical addresses (e.g., Logical Block Addresses (LBAs)) used by the host and included in the read request.

A destination MAC address for the identified SA may be determined by using, for example, an address table associating logical addresses with MAC addresses for different SA. In some implementations, the MAC addresses for different SAs may be included in a logical to physical mapping table. The controller creates a new internal read command as part of a new Ethernet packet based on the read request received from the host. The new Ethernet packet may include a unicast indication so that the Ethernet packet is delivered only to the SA as opposed to being broadcast on the SA network. A frame for the new internal read command indicates a source MAC address of the controller, represented as MAC:a, and a destination MAC address for the identified SA, represented as MAC:b. As discussed in more detail below with reference to FIG. 9A, the controller may also change an NVMe header of the data packet or another type of header used to communicate with the host into a different type of header, such as an internal header used to communicate with the SA.

In the example sequence of FIG. 6, the destination SA, SA 1, reads the requested data and sends it back to the controller. In more detail, a NIC of SA 1 can package the read data into an Ethernet packet in accordance with an Ethernet protocol including a source MAC address for the SA, represented as MAC:b, and a destination MAC address for the controller, represented as MAC:a. The controller receives the read data in the data packet from SA 1 via one or more SA network Ethernet switches, and creates a new Ethernet package including the read data that includes a source MAC address for the controller of MAC:a and a destination MAC address for the host as MAC:h.

An example write sequence is depicted in the bottom half of FIG. 6. As shown in FIG. 6, the host sends a host write request or command to the controller of a DSD via a host network Ethernet switch. The read command is included in an Ethernet packet that includes a source MAC address for the host (i.e., MAC:h) and a destination MAC address for the controller (i.e., MAC:a). The controller receives the write command and identifies a SA for writing the data. The identification of the SA may be performed, for example, by comparing a logical address included in the write command with a logical to physical mapping to determine a physical address and/or a MAC address for the SA for performing the write command.

The controller repackages or reformats the host write command as an internal write command in an Ethernet packet in accordance with an Ethernet protocol. The Ethernet packet may include a unicast indication so that the Ethernet packet is delivered only to the SA, as opposed to being broadcast on the SA network. The frame for the internal write command includes a source MAC address for the controller (i.e., MAC:a) and a destination MAC address for a SA for writing the data in the write command. The controller may also include a proprietary header used for internal communications within the DSD. The internal write command is sent to the destination SA, SA N, via one or more SA network Ethernet switches.

A NIC of SA N receives the internal write command and writes the data included in the write command to a portion of the SA corresponding to a logical address included in the internal write command. In the example of FIG. 6, SA N sends a confirmation of performance of the write command upon completing the write command. The NIC of the SA packages the confirmation or response including a source MAC address for the SA and a destination MAC address for the controller in accordance with an Ethernet protocol. The NIC may also include a proprietary header used for internal communications within the DSD.

The response is sent to the controller via one or more SA network Ethernet switches. The controller repackages or reformats the confirmation or response in accordance with an Ethernet protocol and may optionally change a header for a standard used to communicate with the host that sent the write command, such an NVMe standard, before sending the response back to the host to confirm completion of the write command.

Figure 7:
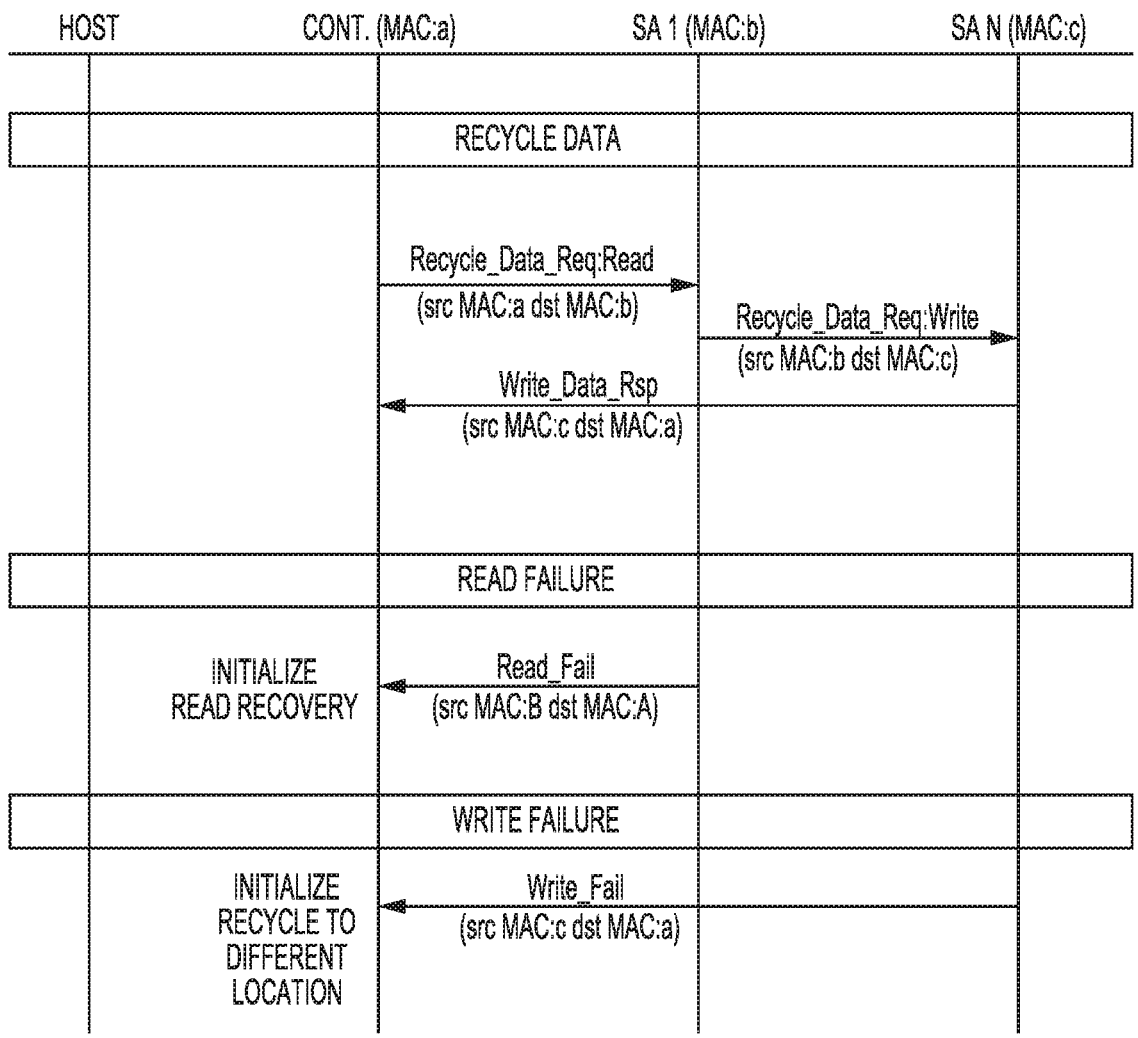
FIG. 7 provides sequence diagrams for performing a recycle command, and error handling during the recycle command according to an embodiment.

FIG. 7 provides sequence diagrams for performing a recycle or copy command, and error handling when performing the recycle command according to an embodiment. As shown in the top portion of FIG. 7 for performing a recycle command, a controller of a DSD may send a recycle or copy data command to a first SA, such as SA 1 in FIG. 7. As discussed above, certain types of memories, such as a NAND flash memory, may require data to be periodically rewritten to maintain the integrity of the data since the stored charge for recording the data may dissipate over time. In addition, such a recycle or copy command may be used to perform garbage collection to rewrite valid data from one SA to a different SA.

The recycle command can start with a controller sending a recycle data request to a current SA storing data that is to be rewritten. The recycle data request from the controller can specify that the data at a particular physical address is to be read and sent to a different physical address in the same or a different SA. In the example of FIG. 7, the recycle read request from the controller includes a source MAC address for the controller and a destination MAC address for the current SA for the data to be read and rewritten in a different location. The recycle read request or command from the controller may also include a final destination MAC address for a SA where the data is to rewritten if it is to be rewritten in a location outside of the current SA.

The SA receives the recycle read request from the controller and reads the requested data using a physical address indicated in the recycle data request. The read data in the example of FIG. 7 is then sent by a NIC for the current SA (i.e., SA 1) to a destination SA (i.e., SA N) using an internal recycle write request specifying the source MAC address for the current SA and the destination MAC address for the destination SA where the data is to be rewritten (i.e., SA N). After the data has been rewritten in the destination SA, the destination SA returns a write data confirmation or response back to the controller that sent the original recycle read request.

In cases where there is an error in reading the data from the current SA (e.g., SA 1 in FIG. 7), the current SA sends a read failure notification back to the controller that issued the recycle data command. As shown in the middle of FIG. 7, SA 1 can send the read failure notification back to the controller in a data packet using an Ethernet protocol including a source MAC address for the current SA and a destination MAC address for the controller. The controller receives the read error notification via one or more SA network Ethernet switches, and initiates a read recovery operation in response to the read failure notification. The read recovery operation can include, for example, accessing parity data or a backup of the data recorded in the current SA. The recovered data can then be rewritten in the intended destination SA or portion of the current SA (e.g., a different block in SA 1) using a write data command from the controller as discussed above with respect to FIG. 6.

In the case where there is a write error in rewriting the data in the destination SA, the destination SA sends a write failure notification back to the controller that issued the recycle data command. As shown at the bottom of FIG. 7, SA N can send the write failure notification back to the controller in an Ethernet packet using an Ethernet protocol including a source MAC address for the destination SA for rewriting the data (e.g., SA N), and a destination MAC address for the controller. The controller receives the write error notification via one or more SA network Ethernet switches, and initiates a new recycle data command to a different destination SA or a different portion of the current SA storing the data. The controller may also note the SA or portion of the SA where the write error occurred and may either limit future writing to this storage location or perform test writes in this storage location to determine whether the storage location has become defective.

Example Communication Formats

Figure 8:
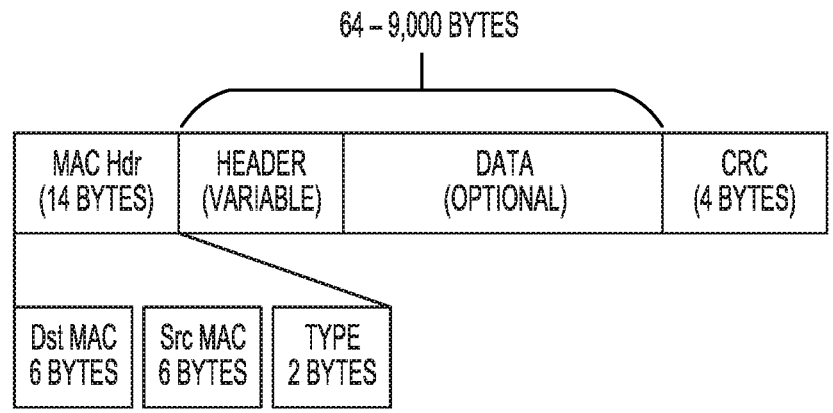
FIG. 8 provides example header formats for host-controller communications and controller-SA communications according to an embodiment.
Figure 8:
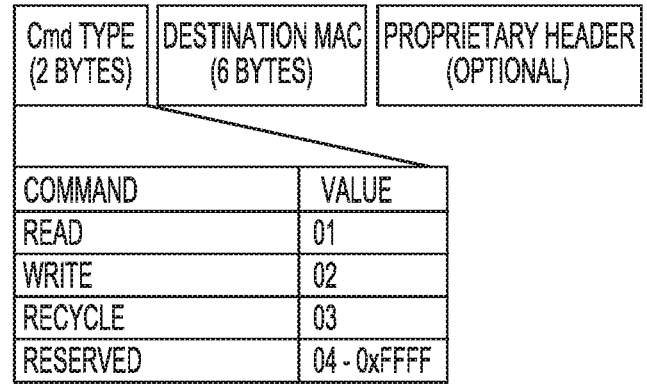

FIG. 8 provides example header formats for a host-controller interface and a controller-SA interface according to an embodiment. As shown in FIG. 8, a frame for an Ethernet communication of the present disclosure can include a MAC header, followed by a header for either host-controller communications or controller-SA communications, a data payload, and 4 bytes of Cyclic Redundancy Check (CRC) data. The frame can be packaged as part of an Ethernet packet by a NIC of a host, or by a NIC or other circuitry of a SA or controller within a DSD.

As shown in the example of FIG. 8, the total size of the header and data portions of the frame can vary between 64 bytes and 9 KB. In such an example, if the header size is 40 bytes, the remaining data portion or data payload may have a size between 24 and 8,960 bytes. As those of ordinary skill in the art will appreciate, other implementations may vary from the exact sizes shown in FIG. 8. For example, a standard Ethernet frame may be limited to 1,500 bytes for the header and data portion, as opposed to the 9 KB maximum size shown in FIG. 8, which may correspond to a jumbo Ethernet frame size. In addition, the example frame format shown in FIG. 8 can be included as part of an Ethernet packet, which includes a seven-octet (or byte) preamble for synchronization and a one octet (or byte) Start Frame Delimiter (SFD) for byte-level synchronization and to mark a new frame.

Within the example frame format shown in FIG. 8, and similar to existing Ethernet MAC standards (e.g., IEEE 802.3), the MAC header includes 6 bytes (or octets) for a destination MAC address, 6 bytes (or octets) for a source MAC address, and 2 bytes (or octets) for a type to indicate either a size of the frame or to indicate which protocol is included in the frame. Per Internet Engineering Task Force (IETF) standards, the first 3 bytes of the MAC address is a vendor-specific address, and the next three bytes is a unique address. Since the MAC addresses for SAs remain internal to the DSD in some implementations (i.e., the SA MAC addresses do not leave the DSD), the 3 bytes vendor-specific address can be repurposed or used as a physical address (e.g., Physical Block Address (PBA)) for the SA. However, the data portion of the frame may still need to include a physical address for a page or block within a package SA or die SA. In implementations where each block is a SA that has its own MAC address, only a page physical address may be needed in the data portion of the frame.

As shown in the example implementation of FIG. 8, the header can include one of two types. The first type (i.e., header type 1 in FIG. 8) is used for communications between a host and a controller of a DSD and can comprise an NVMe header in accordance with the NVMe standard.

The other type of header (i.e., header type 2 in FIG. 8) is used for internal communications between one or more controllers and SAs of a DSD. The first two bytes of the second type of header can include a command type indicating whether the frame contains a command to read data, write data, or copy/recycle data depending on the value of the two bytes. In other implementations, different commands may be included in the command type of the header, as indicated by the reserved field in FIG. 8.

The second type of header also includes an additional destination MAC address of six bytes, which can be used for copy/recycle commands to indicate where the current SA should send the read data to be rewritten. The second type of header may also include a proprietary header, which may be used, for example, encryption or decryption.

The amount of data or payload of the frame can vary. In some cases, the data can include data to be written in an SA or data to be rewritten as part of a recycle data command. In other cases, the data can include one or more logical addresses (e.g., LBAs) or physical addresses (e.g., PBAs) for where data is to be written or read in an SA. As noted above, in some implementations, the SA MAC address may include a physical address as part of the 3 bytes vendor-unique portion of the MAC address.

The CRC portion of the frame or Frame Check Sequence (FCS) allows for the detection of corrupted data in the frame when it is received. An FCS or CRC value is calculated as a function of the remainder of the frame and compared to the CRC data to determine whether the frame content has been corrupted. In addition, the CRC portion of the frame can be used to correct errors detected in the frame.

Figure 9A:
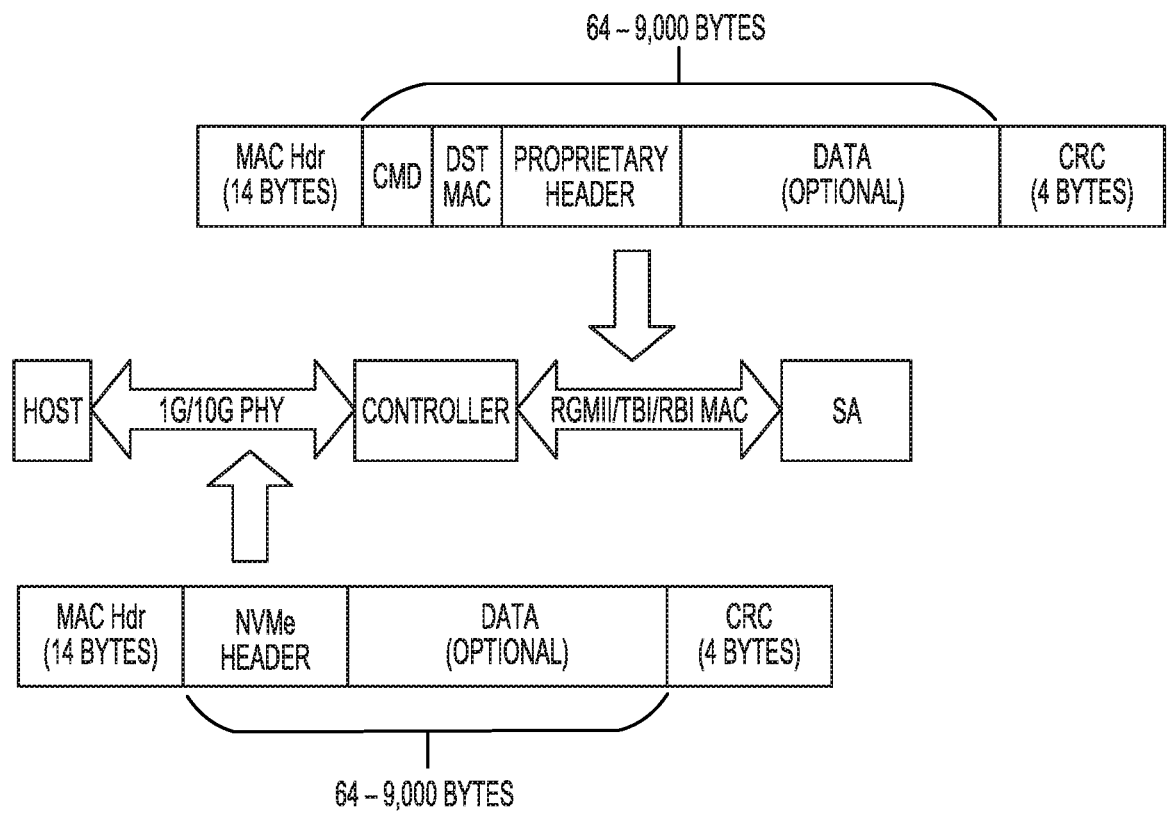
FIG. 9A provides example frame formats for host-controller communications and controller-SA communications according to an embodiment.

FIG. 9A provides example frame or command formats for host-controller communications on a host switched network, and for controller-SA communications on a SA switched network within a DSD according to an embodiment. As shown in the examples of FIG. 9A, the frame format discussed above for FIG. 8 can be used for communications between a host and a DSD controller, and for communications between the DSD controller and a SA of the DSD.

In such implementations, a host may send a command, such as a read or write command, in a frame within an Ethernet packet along a 10M/100M/1G/10G physical layer or PHY to the controller of a DSD or to a NIC of the controller. The controller may then repackage or reformat the received host command for forwarding the command as an internal command in a new Ethernet packet and frame to a SA of the DSD.

In the example of FIG. 9A, the controller may replace an NVMe header used in the frame received from the host with the second type of header discussed above with reference to FIG. 8, which includes a command type, a destination MAC address, and a proprietary header. In addition, the source MAC address of the host and destination MAC address of the controller in the MAC header received from the host are replaced by the MAC address of the controller and the MAC address of the SA, respectively. The controller may also include a different preamble and SFD for synchronization of the new Ethernet packet. In addition, the data portion of the frame received from the host may be modified by including one or more physical addresses for identifying a portion of the destination SA for performing the internal command. The internal command of the new Ethernet packet can be sent by the controller or a NIC of the controller along internal physical connections that may use a physical interface standard, such as RMII, RGMII, TBI or RBI.

As indicated in FIG. 9A, this process may be reversed with the SA sending an Ethernet packet including the internal frame format discussed above to the controller. For data or notifications intended for the host, the controller then repackages or creates a new frame for communication to the host in a new Ethernet packet using the external frame format including the NVMe header. As noted above, other implementations may include a different frame format, such as in cases where the controller communicates with the host using a different standard, such as PCIe. In such an example, a PCIe header can replace the NVMe header shown in FIG. 9A.

Figure 9B:
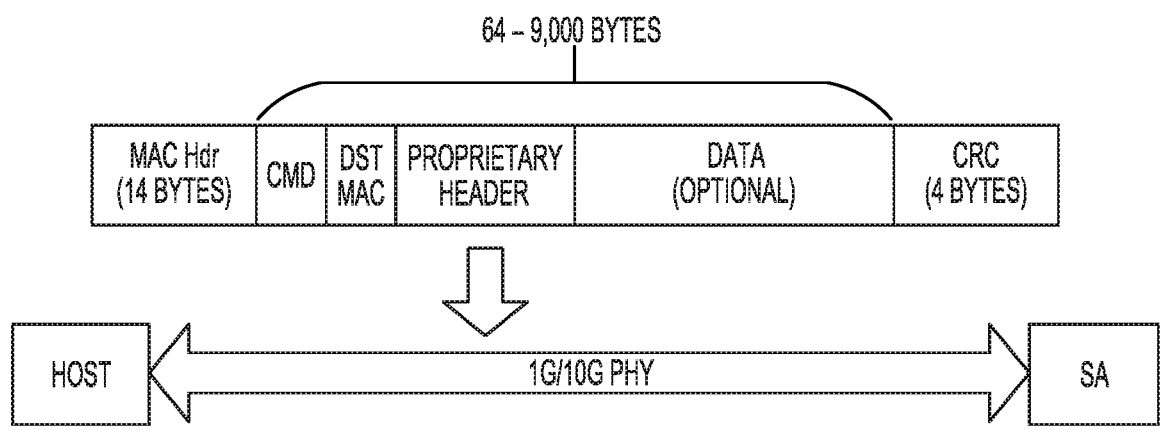
FIG. 9B provides an example frame format for host-SA communications according to an embodiment

FIG. 9B provides an example frame format for host-SA communications according to an embodiment where the host can communicate directly with the SAs of the DSD without the controller of the DSD needing to repackage or create a new Ethernet packet. In such implementations, the controller forwards the command or Ethernet packet received from the host toward the SA identified by the MAC address in the command without changing the command or Ethernet packet. In this regard, the command received from the host also serves as an internal command within the DSD. Any host network Ethernet switches, controllers and SA network Ethernet switches between the host and the SA identified by the MAC address forward the Ethernet packet toward the SA without changing the Ethernet packet.

The host in such implementations may send a command using the internal frame format discussed above for FIG. 9A, and include the SA MAC address as the destination address in the MAC header and the host MAC address as the source address in the MAC header. This may be performed in part by using a driver or other application executing at the host. Similarly, SAs in the DSD may send data or notifications directly to the host using the MAC address for the host as a destination address and the MAC address for the SA as the source address. Any intermediate SA network Ethernet switches, controllers and host network Ethernet switches between the SA and the host can forward the data or notifications from the SA toward the host without changing the Ethernet packet.

In both of the examples of FIGS. 9A and 9B where an Ethernet protocol is used to communicate between the host and SAs within the DSD, a more seamless end-to-end connectivity is possible from the host level down to the SA level that can take advantage of Ethernet flow controls based on data traffic and priorities set by the host, as discussed in more detail below with reference to FIG. 10. Although different implementations of the present disclosure may only use Ethernet protocol within the DSD and may use a different transport technique for communications between the host and the DSD (e.g., NVMe over Fabrics (NVMe-oF) that may include Fibre Channel (FC), InfiniBand, RoCE, iWARP, or other fabrics not including Ethernet protocol), the use of Ethernet protocol within the DSD would still allow for the use of such flow controls within the DSD.

Example Command Processes

Figure 10:
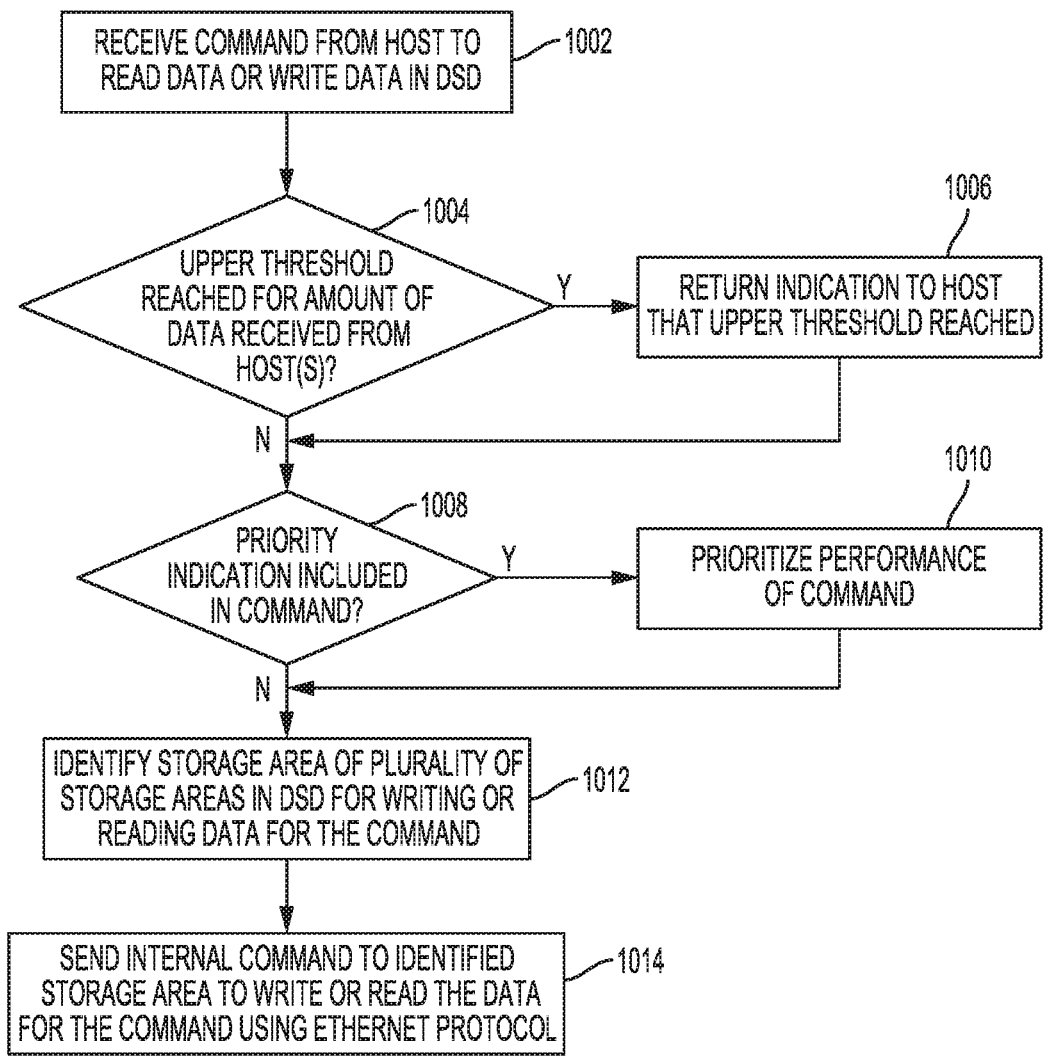
FIG. 10 is a flowchart for a host command process according to an embodiment.

FIG. 10 is a flowchart for a host command process according to an embodiment. The process of FIG. 10 may be performed, for example, by a controller (e.g., controller 106, 109 or 112 in FIGS. 1 and 2) executing a firmware of a DSD.

In block 1002, a command is received at a DSD from a host to write data or read data in the DSD. The host command may be received as part of an Ethernet packet or a frame within such an Ethernet packet from the host via a host network Ethernet switch of the DSD. Although the example process of FIG. 10 involves communication between the DSD and the host using an Ethernet protocol, the host command in other implementations may not be included in an Ethernet packet, but may instead be received using a different interface such as NVMe, PCIe, or SCSI via a data bus as opposed to a network. In such implementations, blocks 1004 and 1006 may be omitted.

In block 1004, the controller determines whether an upper threshold has been reached for an amount of data received from one or more hosts. In some implementations, an Ethernet flow control, such as IEEE 802.3x Ethernet pause based flow control or IEEE 802.1Qbb priority based flow control, can be used to back-pressure or regulate the data being received by the controller to help improve Input-Output (IO) consistency and latency by making the host aware of when the controller may be at an upper limit for handling data traffic so that the host can redirect Ethernet packets to a different controller.

If the upper threshold has been reached for data traffic being received by the controller, the controller in block 1006 can return an indication to the host that sent the Ethernet packet that an upper threshold has been reached. The host may then temporarily delay or redirect Ethernet packets that would otherwise be directed to the controller for a predetermined period of time. In implementations where the host can communicate with multiple DSD controllers either in the same DSD or in different DSDs, the indication can be used to more efficiently distribute commands among the different controllers for load sharing.

On the other hand, if the upper threshold has not been reached in block 1004, the controller determines in block 1008 whether there is a priority indication included in the command or Ethernet packet received from the host. The priority indication may be included in a header, such as an NVMe header or in a data portion of a frame of the Ethernet packet. The host may designate certain commands as being a critical or non-critical transaction using an Ethernet standard, such as, for example, IEEE 802.1q or IEEE 802.1p, to differentiate different Ethernet packets as having different priority levels. Some examples of a critical transaction, can include, for example, transactions required for an operating system of the host computer or commands that are specified to be performed with a certain level of QoS, such as within a predetermined period of time.

If it is determined in block 1008 that a priority indication is included in the command/frame, the controller in block 1010 prioritizes performance of the command. Such prioritization can include, for example, processing and sending an internal command for performing the host command ahead of other host commands or internal commands that may have been received before the host command. The priority indication may also be included with the internal command sent by the controller to obtain a specified QoS. This can allow for an end-to-end QoS from the host to the SA.

In block 1012, the controller identifies a SA from among a plurality of SAs in the DSD for writing or reading data for the command. As discussed above, the controller may use a logical to physical mapping to identify a physical address (which may be included as part of the MAC address for the SA) associated with a logical address included in the host command.

In block 1014, the controller sends an internal command in a new Ethernet packet using an Ethernet protocol to the identified SA to write or read the data for the host command. The frame/internal command includes a source MAC address for the controller and a destination MAC address for the identified SA in a MAC header of the frame of the Ethernet packet. In addition, the controller can include a physical address in a data portion of the frame for the block or page of physical memory in the SA for performing the read or write command. An internal header may also be included in the new Ethernet packet that can include a command type (e.g., read or write), a destination MAC address, and a proprietary header for the DSD, as discussed above with reference to FIG. 9A.

Figure 11:
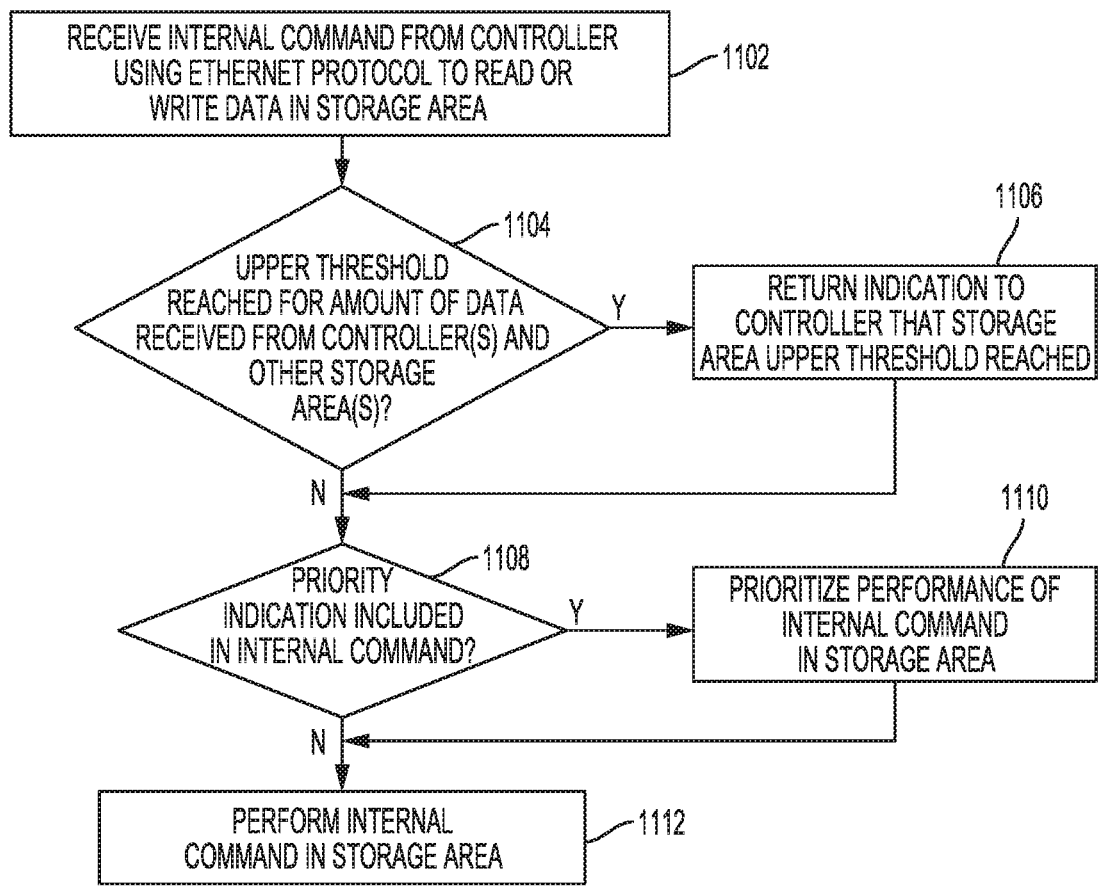
FIG. 11 is a flowchart for an internal command process according to an embodiment.

FIG. 11 is a flowchart for an internal command process according to an embodiment. The process of FIG. 11 may be performed by, for example, a NIC or other circuitry of a SA (e.g., NIC 116 in FIGS. 4 and 5) executing a firmware of the SA.

In block 1102, the SA receives an internal command from a controller of the DSD using an Ethernet protocol to read or write data in a SA. The internal command may be included in an Ethernet packet that includes an internal frame format as discussed above for FIG. 9A.

In block 1104, the SA determines whether an upper threshold has been reached for an amount of data received from one or more controllers of the DSD including the SA and from other SAs in the DSD. In some implementations, an Ethernet flow control, such as those included in the wireless Ethernet standard IEEE 802.11, can be used to back-pressure or regulate the data being received by the SA to help improve IO consistency and latency by making the controller aware of which SAs may currently be operating at an upper limit for performing commands so that other commands can be redistributed to different SAs. This can ordinarily provide for a more efficient use of SAs through load sharing.

If the upper threshold has been reached for data traffic being received by the SA, the SA in block 1106 can return an indication to the controller that sent the Ethernet packet that an upper threshold has been reached. The controller may then delay or redirect Ethernet packets that would otherwise be directed to the SA for a predetermined period of time.

On the other hand, if the upper threshold has not been reached in block 1104, the controller determines in block 1108 whether there is a priority indication included in the command or Ethernet packet received from the controller. The priority indication may be included in a header, such as the proprietary header in the example internal frame shown in FIG. 9A or in a data portion of the internal frame. The controller may designate certain commands as being a critical or non-critical transaction to specify a certain level of QoS so that the command is performed within a predetermined period of time. In some implementations, the controller may use an Ethernet standard, such as, for example, IEEE 802.1q or IEEE 802.1p, to differentiate different Ethernet packets as having different priority levels. As discussed above with reference to FIG. 10, the priority indication included in the internal command received by the SA may be based on a priority indication received from a host in a host command.

If it is determined in block 1108 that a priority indication is included in the command, the SA in block 1110 prioritizes performance of the command. Such prioritization can include, for example, performing the command in the SA ahead of other commands that may have been received by the SA before receiving the prioritized command.

In block 1112, the SA performs the internal command in the SA by reading data for the command or writing data for the command. As noted above, the use of a priority indication in both internal commands and host commands can allow for an end-to-end (i.e., from host to SA) QoS. In addition, the use of upper thresholds made possible with using an Ethernet protocol inside a DSD can ordinarily allow for data traffic to be back-pressured or regulated from the SA level all the way back to the host.

Figure 12:
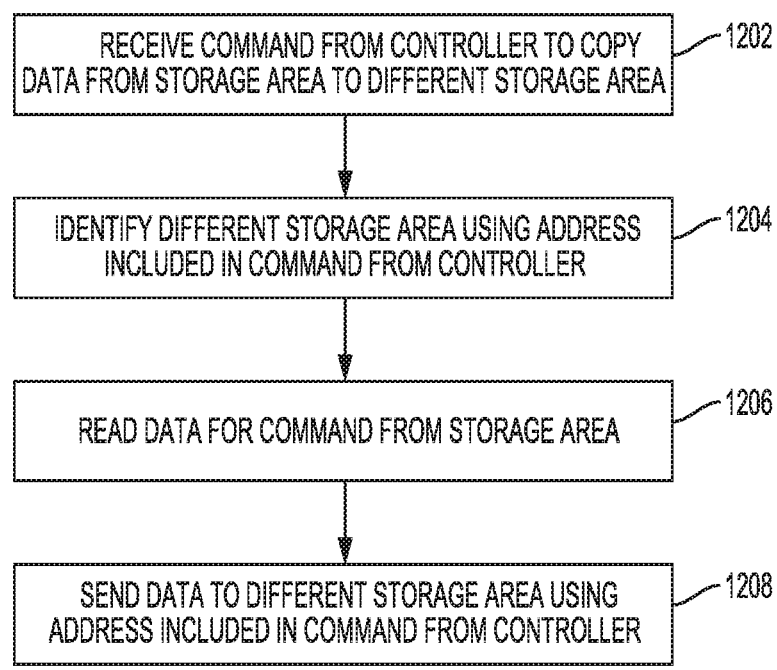
FIG. 12 is a flowchart for a copy command process according to an embodiment.

FIG. 12 is a flowchart for a recycle or copy command process according to an embodiment. The process of FIG. 12 may be performed by a NIC or other circuitry of a SA executing a firmware of the SA.

In block 1202, a command is received from a controller to copy data from the SA to a different SA. As discussed above, the command may be performed to refresh data to be read from the SA receiving the command and rewritten in a different location. The command may be designated as a recycle/copy data command by using, for example, a command type in a portion of a frame of an Ethernet packet for the frame received from the controller.

In block 1204, the SA receiving the command identifies the different storage area using an address included in the command. In some implementations, the internal command received by the SA may include a destination MAC address as part of the frame. In other implementations, the address for the other SA may be included as part of the data portion of the frame.

In block 1206, the SA reads the data for the command. The data portion of the frame may include a logical address or physical address for a block in the SA that is to be copied to the other SA. In implementations where each SA is a block, the data for the block can be read without the need to identify a particular portion within the SA.

In block 1208, the read data is packaged in a data portion of a frame and sent to the destination SA using an Ethernet protocol. As discussed above, the read data does not need to be sent to a controller, but rather, can proceed to the other SA for rewriting the data since the Ethernet packet includes the destination MAC address for the other SA and one or more SA network Ethernet switches in the DSD can send the Ethernet packet including the data directly to the other SA.

The foregoing arrangements of using Ethernet connections among one or more controllers and one or more SAs within a DSD ordinarily reduce data traffic between controllers and SAs within the DSD since data does not need to return to the controller for maintenance operations such as for refreshing data or performing garbage collection. The SA Ethernet network also conserves resources of the controller, which does not need to process the data being copied for such maintenance operations. In addition, the use of Ethernet standards can allow for setting a QoS, prioritization, and upper limit for data traffic at various components within the DSD. When an Ethernet interface is also implemented between the host and the DSD, an end-to-end QoS and prioritization of data can be performed from the host level to the SA level by leveraging existing Ethernet standards.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or a controller to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or a controller, such as, for example, a CPU, an MPU, an MCU, or a DSP, and can include, for example, an FPGA, an ASIC, or other programmable logic device, discrete gate or transistor logic, discrete hardware components, or any combination thereof designed to perform the functions described herein. A processor or controller may also be implemented as a combination of computing devices, e.g., a combination of a DSP and an MPU, a plurality of MPUs, one or more MPUs in conjunction with a DSP core, or any other such configuration. In some implementations, the controller or processor may form at least part of an SoC.

The activities of a method or process described in connection with the examples disclosed herein may be embodied directly in hardware, in a software or firmware module executed by a processor or a controller, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or the controller can read information from, and write information to, the storage medium. In the alternative, the storage medium may be integral to the processor or the controller.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A Data Storage Device (DSD), comprising:
    a plurality of solid-state memories for storing data, wherein the plurality of solid-state memories are memory blocks or memory dies; and
    a controller configured to receive a command from a host to write data or read data in the DSD,
    wherein the controller and each of the plurality of solid-state memories are configured to communicate using an Ethernet protocol and each solid-state memory of the plurality of solid- state memories has its own Media Access Control (MAC) address, and
    wherein the respective MAC address for each solid-state memory is located in a header separate from an external MAC address for the DSD that is included in commands received from the host.

2. The DSD of claim 1, wherein the controller is further configured to send a command to a first solid-state memory of the plurality of solid-state memories to copy data stored in the first solid-state memory to a second solid-state memory of the plurality of solid-state memories, the command including an address identifying the second solid-state memory, and
    wherein the first solid-state memory is configured to send the data to be copied to the second solid-state memory without sending the data to be copied to the controller by using the address for the second solid-state memory included in the command.

3. The DSD of claim 1, wherein the controller is further configured:
    determine that an upper threshold has been reached for an amount of data received from one or more hosts in a predetermined period of time; and
    return an indication to the host that the upper threshold has been reached.

4. The DSD of claim 1, wherein the controller is further configured to prioritize performance of the command for a specified quality of service based on a priority indication included in the command.

5. The DSD of claim 1, further comprising:
    one or more host network Ethernet switches configured to connect to one or more hosts; and
    one or more storage area network Ethernet switches configured to connect to one or more solid-state memories of the plurality of solid-state memories.

6. The DSD of claim 5, wherein the one or more storage area network Ethernet switches includes at least one pair of storage area network Ethernet switches connected to each other and configured to provide an additional path to the one or more solid-state memories connected to the respective storage area network Ethernet switch of the at least one pair of storage area network Ethernet switches.

7. The DSD of claim 1, wherein in response to the command received from the host, the controller is further configured to:
identify a solid-state memory of the plurality of solid-state memories for writing or reading data for the command; and
send an internal command to the identified solid-state memory to write or read the data for the command using the Ethernet protocol.

8. The DSD of claim 7, wherein the identified solid-state memory is configured to:
receive the internal command from the controller;
determine whether a storage area upper threshold has been reached for an amount of data received from at least one of one or more controllers of the DSD and one or more other solid-state memories of the plurality of solid-state memories in a predetermined period of time; and
in response to determining that the storage area upper threshold has been reached, return an indication to the controller that the storage area upper threshold has been reached.

9. The DSD of claim 7, wherein the identified solid-state memory is configured to:
receive the internal command from the controller; and
prioritize performance of the received internal command in the identified solid-state memory for a specified quality of service based on a priority indication included in the internal command.

10. The DSD of claim 1, wherein the command received from the host includes a MAC address identifying a solid-state memory of the plurality of solid-state memories, and wherein the controller is further configured to forward the command received from the host toward the solid-state memory identified by the MAC address in the command without changing the command.

11. A method of operating a Data Storage Device (DSD), the method comprising:
receiving a command from a host to write data or read data in the DSD;
identifying a solid-state memory of a plurality of solid-state memories in the DSD for writing the data or reading the data for the received command, wherein the plurality of solid-state memories are memory blocks or memory dies; and
sending an internal command to the identified solid-state memory to write the data or read the data for the command using an Ethernet protocol, wherein each solid-state memory of the plurality of solid-state memories has its own Media Access Control (MAC) address, and
wherein the respective MAC address for each solid-state memory is located in a header separate from an external MAC address for the DSD that is included in commands received from the host.

12. The method of claim 11, further comprising:
sending a recycle command to a first solid-state memory of the plurality of solid-state memories to copy data stored in the first solid-state memory to a second solid-state memory of the plurality of solid-state memories, wherein the recycle command includes an address identifying the second solid-state memory, and wherein the first solid-state memory is configured to send the data to be copied to the second solid-state memory without sending the data to be copied to a controller of the DSD by using the identifying address for the second solid-state memory included in the recycle command.

13. The method of claim 11, further comprising:
determining an upper threshold has been reached for an amount of data received from one or more hosts in a predetermined period of time; and
returning an indication to the host that the upper threshold has been reached.

14. The method of claim 11, further comprising prioritizing the performance of at least one of the command received from the host and the internal command sent to the identified solid-state memory for a specified quality of service based on a priority indication included in the command received from the host.

15. The method of claim 11, further comprising:
determining whether to send the command from the host on a first path to the identified solid-state memory through a first host network Ethernet switch and a first storage area network Ethernet Switch or to send the command from the host on a second path through a second host network Ethernet switch and a second storage area network Ethernet switch connected to the first storage area network Ethernet switch.

16. The method of claim 15, further comprising determining whether to send the command from the host on the first path or the second path based on at least one of an availability of the first host network Ethernet switch, an availability of a controller of the DSD, and an amount of data traffic through the first host network Ethernet switch.

17. The method of claim 11, further comprising:
receiving the internal command at the identified solid-state memory;
determining whether a storage area upper threshold has been reached for an amount of data received at the identified solid-state memory from at least one of one or more controllers of the DSD and one or more other solid-state memories of the plurality of solid-state memories in a predetermined period of time; and
in response to determining that the storage area upper threshold has been reached, returning an indication that the storage area upper threshold has been reached for the identified solid-state memory.

18. The method of claim 11, further comprising:
receiving the internal command at the identified solid-state memory; and
prioritizing performance of the internal command in the identified solid-state memory for a specified quality of service based on a priority indication included in the internal command.

19. A method of operating a memory block or a memory die in a Data Storage Device (DSD), the method comprising:
receiving a command from a controller of the DSD to copy data from the memory block or the memory die to a different memory block or a different memory die of the DSD;
identifying the different memory block or the different memory die using an address for the different memory block or for the different memory die included in the command received from the controller;
reading the data for the received command from the memory block or the memory die;
sending the data to the different memory block or the different memory die using the address for the different memory block or for the different memory die included in the command received from the controller; and
wherein the memory block or the memory die and the different memory block or the different memory die each have their own Media Access Control (MAC address, and wherein the respective MAC addresses for the memory block located in a header separate from an external MAC address for the DSD that is included in commands received from a host.

20. The method of claim 19, wherein the command received from the controller uses an Ethernet protocol.

21. The method of claim 19, further comprising:
   determining a storage area upper threshold has been reached for an amount of data received from at least one of one or more controllers of the DSD and one or more other memory blocks or other memory dies of the DSD in a predetermined period of time; and
   in response to determining that the storage area upper threshold has been reached, returning an indication to at least one of the controller and the different memory block or the different memory die that the storage area upper threshold has been reached for the solid-state memory.

22. The method of claim 19, further comprising sending the data to the different memory block or the different memory die through a first storage area network Ethernet switch of the DSD that is connected to the memory block or the memory die, and further through a second storage area network Ethernet switch of the DSD that is connected to the different memory block or the different memory die.

* * * * *